(12) United States Patent
Hecht (10) Patent No.: US 6,845,209 B1
(45) Date of Patent: Jan. 18, 2005

(54) FIBRE-OPTIC CABLE NETWORK

(76) Inventor: Martin Hecht, Birnerstr. 2, 93167 Falkenstein (DE)

( * ) Notice: Subject to any disclaimer, the term of this patent is extended or adjusted under 35 U.S.C. 154(b) by 0 days.

(21) Appl. No.: 09/355,117

(22) PCT Filed: Jan. 20, 1998

(86) PCT No.: PCT/EP98/00295

§ 371 (c)(1),
(2), (4) Date: Oct. 15, 1999

(87) PCT Pub. No.: WO98/32043

PCT Pub. Date: Jul. 23, 1998

(30) Foreign Application Priority Data

Jan. 20, 1997 (DE) .......................................... 197 01 787

(51) Int. Cl.[7] ................................................ G02B 6/10
(52) U.S. Cl. ...................................................... 385/136
(58) Field of Search ................................ 385/134–138

(56) References Cited

U.S. PATENT DOCUMENTS 4,804,020 A * 2/1989 Bartholomew .............. 138/111

FOREIGN PATENT DOCUMENTS

| DE | A-42 03 718 | 8/1993 |
| JP | 5-272664 | 10/1993 |

* cited by examiner

*Primary Examiner*—Khiem Nguyen
(74) *Attorney, Agent, or Firm*—Muramatsu & Associates (57) ABSTRACT

An optical wave-guide cable network can be extended into buildings easily, quickly and economically, in a flexible and operatively reliable manner, at any time of year. The optical wave-guide cable network includes the optical wave-guide cables mounted on the wall of inaccessible conduit or pipe systems by means of fixing elements. The fixing elements includes means for holding at least one optical wave-guide cable and means for fixing on the wall of the conduit or pipe system. The fixing means are formed by a resiliently prestressed, closed stainless steel ring which presses against the wall of the conduit or pipe system.

10 Claims, 7 Drawing Sheets

FIBRE-OPTIC CABLE NETWORK

FIELD OF THE INVENTION

The invention relates to an optical wave-guide cable network through which an optical wave-guide infrastructure can be extended into buildings easily, quickly and economically, in a flexible and operatively reliable manner, at any time of year.

BACKGROUND OF THE INVENTION

Optical wave-guide cable networks are superior to the conventional communication networks based on copper, particularly with regard to transmission rates and transmission quality. Efforts are therefore being made to extend the optical wave-guide infrastructure for local, regional and long-distance communication connections. Efforts are also being made to integrate optical wave-guides gradually into existing copper telecommunication networks and to supply broad-band cable networks for the cable television service. A substantially broad-band supply and with it a forward-looking strengthening of the broad-band cable network for the provision of additional, new services, as well as the integration of energy-supply networks used for communications technology in communication networks is also economically desirable.

In order to extend the optical wave-guide cable network, at the moment, roads, footpaths, and other areas are dug up in order to lay the cables either directly or in so-called cable ducts. However, laying in this manner is very time-consuming and expensive and is only possible in frost-free ground.

In order to avoid digging works, so-called overhead cables can also be installed. This technique is used particularly for electrical power-supply in the long-distance communications range. In local and regional networks, however, owing to various disadvantages, overhead cables are now hardly used for supplying subscribers.

A cable-laying method has also recently been tried, in which a channel is cut in the road or footpath, the optical wave-guide cable is then put in place and the opening is filled with a filling material. The mechanical damage to the road or to the footpath is indeed considerably less than with cable-laying by excavation, but a lasting impairment or deterioration of the highways is also caused in this case.

In DE-A-42 03 718 it is proposed to lay the optical wave-guide cable in accessible water conduits, particularly storm sewers and to provide junctions to other cable-network sections on the manhole covers or on the walls of gullies or manholes. Digging works are necessary for connection to other networks.

A fixing element by which glass-fibre cables can be secured in sewers is known from JP-A-5 272 664. This known fixing element is prestressed so as to be approximately horseshoe-shaped prior to mounting in the sewer and is held in this shape by a connecting rod. The fixing element is connected to the cable and put in place in the sewer. As soon as all fixing devices have been put in place along the entire length in the sewer, the respective connecting rods, which are connected to one another by means of a wire, are pulled out and the fixing element presses itself against the sewer wall. This method of laying cables in sewers has the disadvantage, however, that, during the pulling-out of the rods, the fixing elements may slip and an optimal arrangement of the cable, for example, on the upper side of the sewer, is thus no longer assured. Moreover, this type of cable mounting is comparatively expensive.

SUMMARY OF THE INVENTION

The object of the invention is therefore to provide an optical wave-guide cable network, by means of which the optical wave-guide infrastructure can be extended into buildings easily, quickly and economically, in a very flexible and operatively reliable manner, at any time of year.

According to the invention, the fixing means is constituted by a resiliently prestressed, closed special-steel ring which presses against the wall of the conduit and pipe system.

By the use of existing, inaccessible conduit and pipe systems such as, for example, the sewage system or gas-pipe systems, the optical wave-guide cables can easily be laid into individual buildings. The laying takes place with the aid of a remotely-controllable conduit robot which puts the cable in place in the conduit and pipe system and fixes it to the walls, taking the fixing elements from a magazine carried along with the robot.

A particularly flexible optical wave-guide cable network is produced when the individual optical wave-guide cable comprises an outer metal sheath tube in which the optical wave-guides are contained, a plurality of optical wave-guide cables of this type being fixed side by side and flat against the wall of the conduit or pipe system. The cable system should be constructed in a manner such that it is not damaged by rodents, by cleaning and inspection operations, or by alkaline or acidic sewage.

Further embodiments of the invention are described in greater detail with reference to some examples and to the drawings.

DETAILED DESCRIPTION OF THE INVENTION

Figure 1:
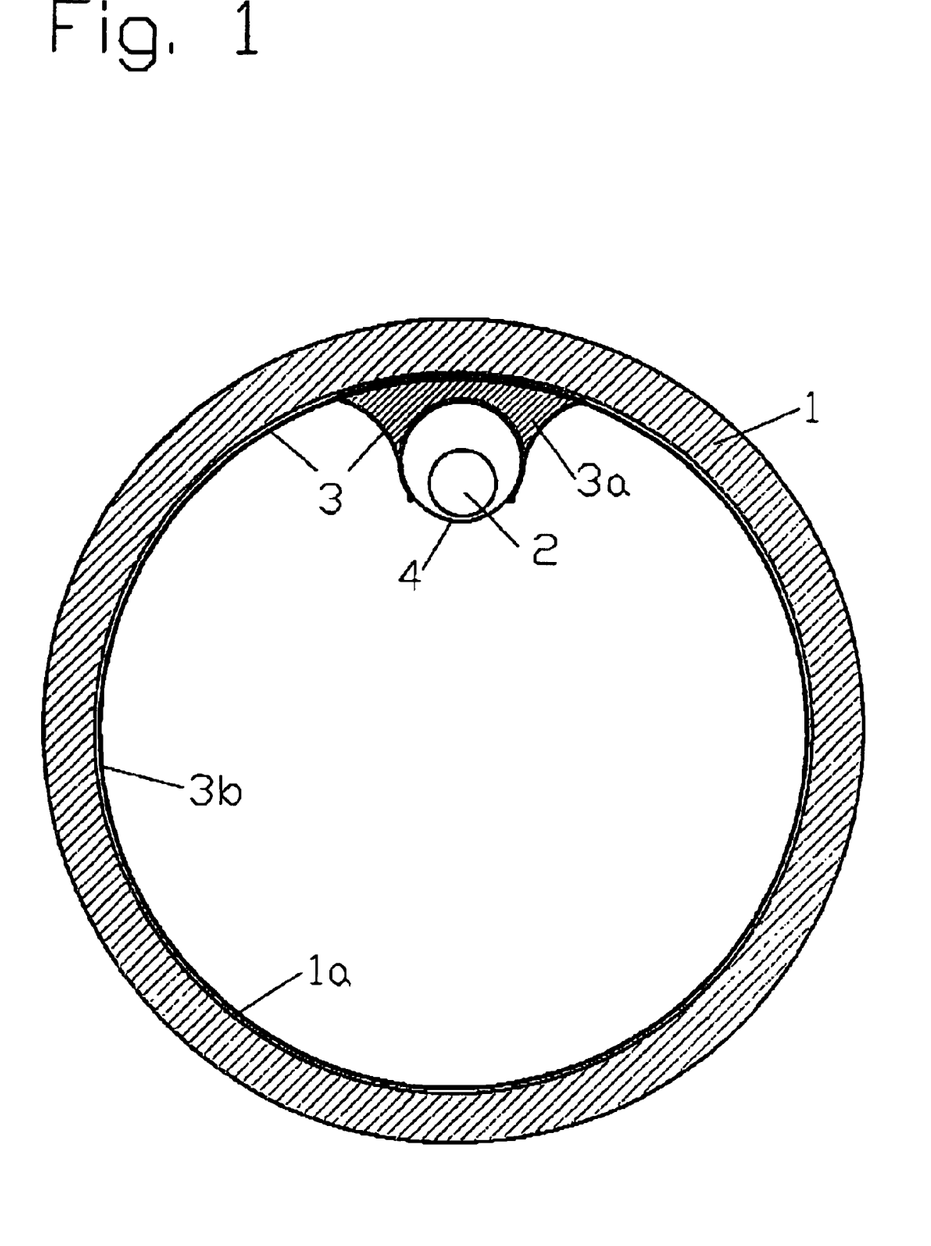
FIG. 1 is a schematic cross-sectional view, with a first fixing element.

FIG. 1 shows a cross-section of a pipe 1 which, for example, is used as a sewage pipe of a conduit or pipe system. An optical wave-guide cable 2 is supported on a wall 1a of this pipe 1 with the aid of a fixing element 3.

The optical wave-guide cable 2 is laid in an inaccessible conduit or pipe system. The inside diameter of the pipe 1 in this case is, in particular, less than 1 m.

The optical wave-guide cable network is laid in pipes of this type with the aid of a remotely-controllable conduit robot which positions and fixes the optical wave-guide cable in the pipe. The conduit robot can, however, also be used efficiently in accessible pipes.

Especially with inaccessible conduit or pipe systems, various requirements are made with regard to the type of fixing and to the position thereof inside the pipe.

The optical wave-guide cable is normally fixed in a manner such that the primary use of the conduit or pipe system is affected as little as possible. Moreover, the fixing must not lead to damage or impairment of the system arising in the relatively long term. Since it is not always possible to avoid, for example, contact of the sewage flowing through the pipe with the optical wave-guide cable and the fixing elements, the fixing elements are shaped so as to favour a flow, as can be seen in particular from the longitudinal sectional view of FIG. 2. The fixing elements 3 should, in particular, be formed in a manner such that dirt particles carried along with the sewage cannot settle on the fixing elements.

Figure 2:
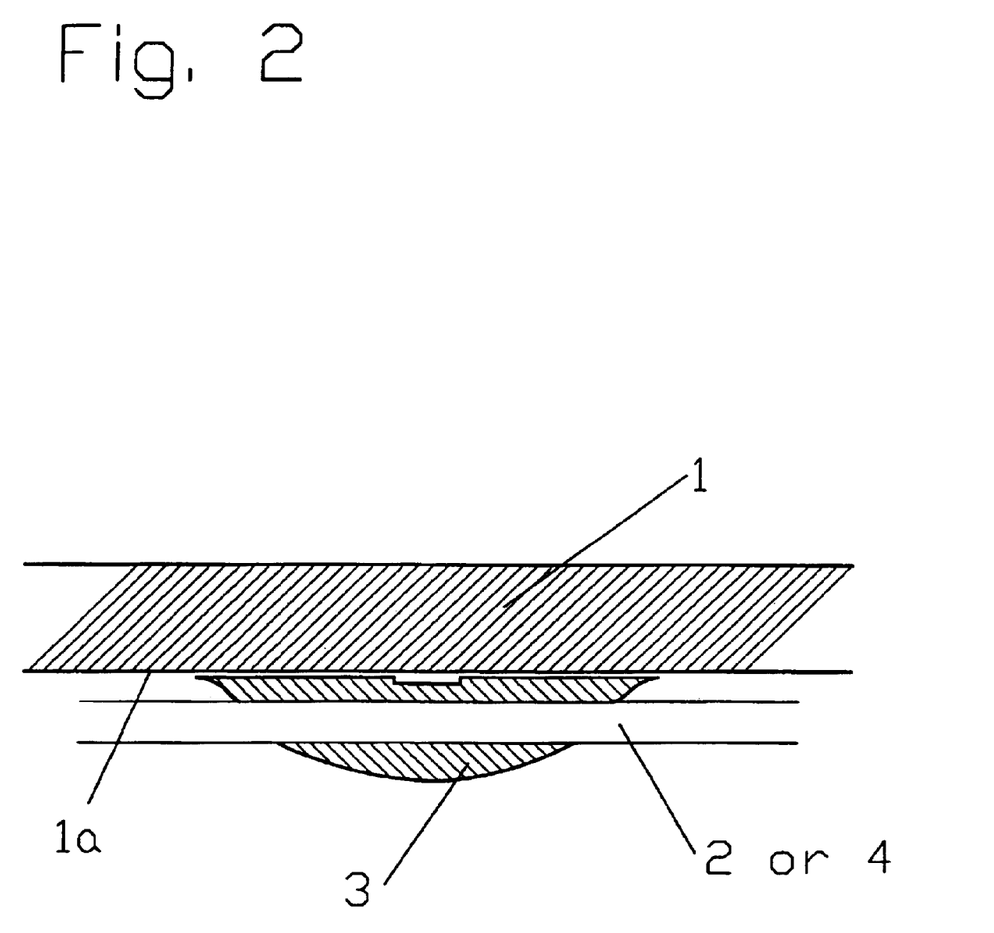
FIG. 2 is a schematic longitudinal sectional view of the fixing element according to FIG. 1.

The fixing elements 3 are composed, on the one hand, of means 3a for holding at least one optical wave-guide cable 2, and means 3b for fixing to the wall 1a of the pipe 1.

The fixing means 3b of the fixing element 3 are formed by a resiliently prestressed, closed special-steel ring which presses against the wall 1a of the pipe 1.

The means 3a for holding the optical wave-guide cable are formed, for example, as snap clips. The holding means 3a and the fixing means 3b may be formed either in one piece or as separate components. In the latter case, a suitable connection means would have to be provided.

In the embodiment shown, the optical wave-guide cable is carried in a cable duct 4 which protects the optical wave-guide cable from damage by rodents, by cleaning and inspection operations, or by alkaline or acidic sewage. The cable duct 4 may, for example, be made of flexible cable ducting in which the optical wave-guide cable is installed in accordance with known methods.

Figure 6:
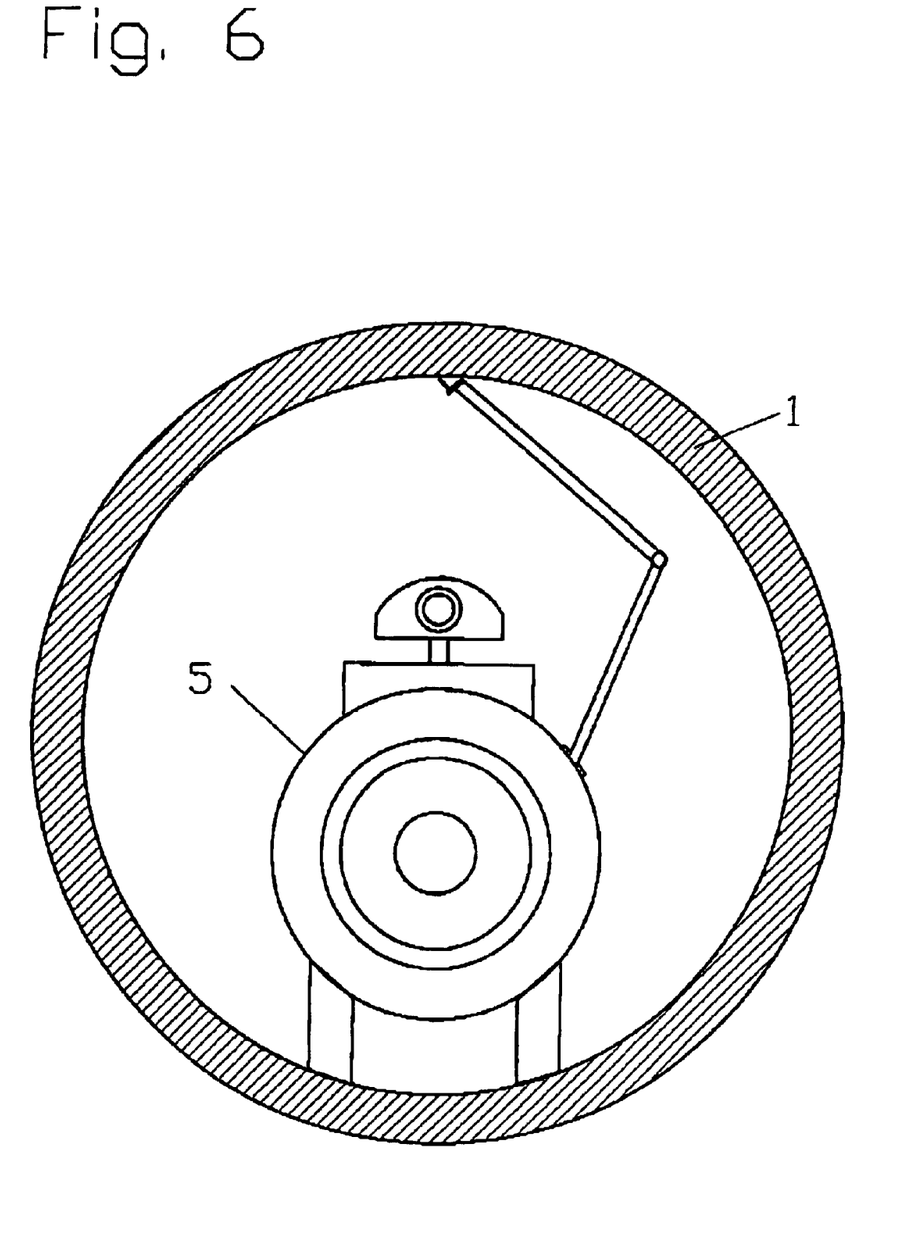
FIG. 6 is a schematic view of a conduit robot.

The optical wave-guide cable is laid and fixed by a remotely-controllable conduit robot 5 which is shown schematically in FIG. 6.

Figure 3:
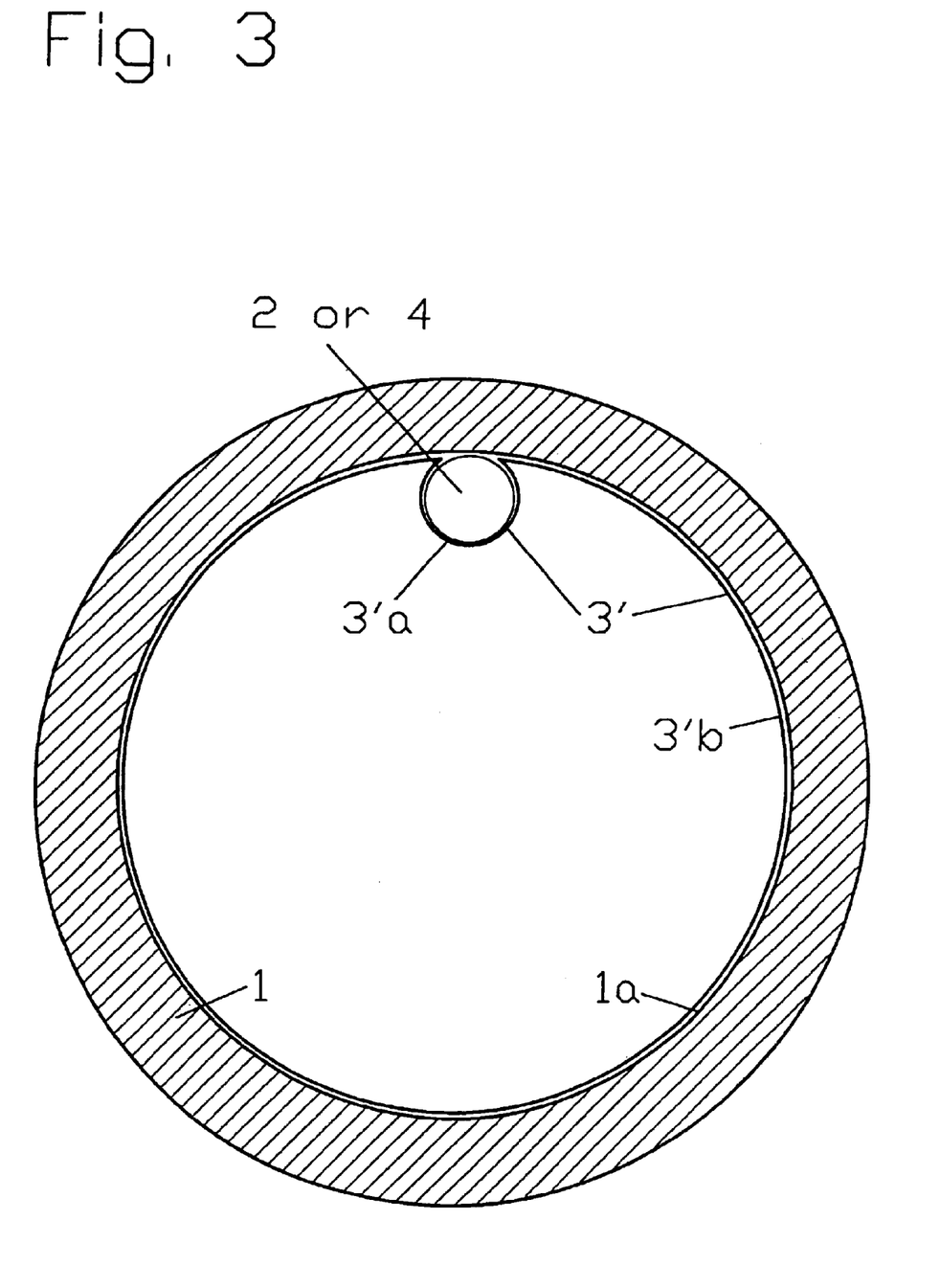
FIG. 3 is a schematic cross-sectional view, with a second fixing element.

FIG. 3 shows a second embodiment of a fixing element 3', the fixing means 3'b of which is also formed as a closed special-steel ring which is merged with the holding means 3'a in one piece. In the region of the holding means 3'a, the closed special-steel ring which, for example, is made of spring stainless-steel strip, comprises a circular indentation that holds the optical wave-guide cable 2 which is composed, in the minimal case as described, of a single metal tube with the fibres inside. The optical wave-guide cable 2 is also surrounded, for example, by a cable duct 4 in this case.

The optical wave-guide cable 2 is fixed between the wall 1a of the pipe 1 and the fixing element 3', in accordance with FIG. 3.

Figure 4:
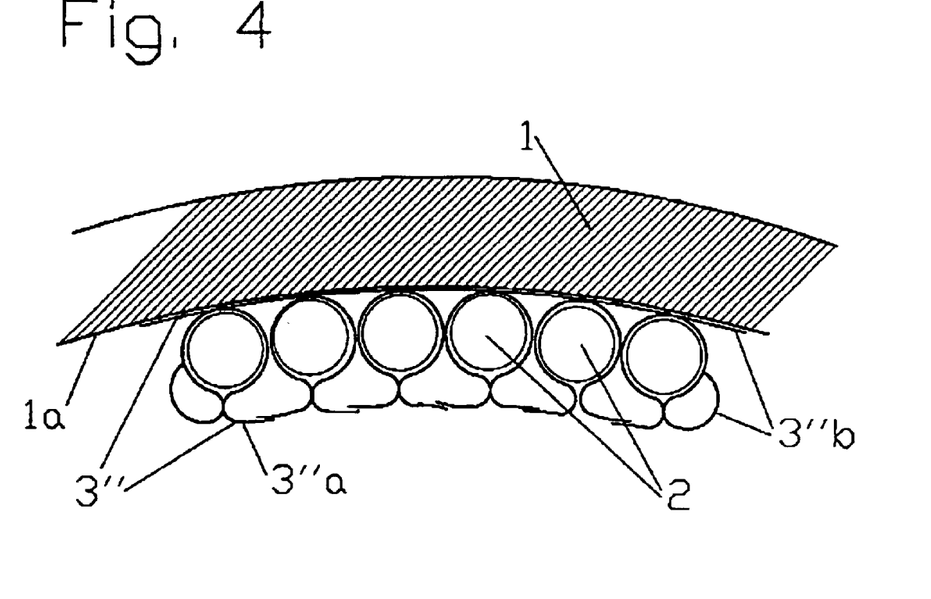
FIG. 4 is a schematic cross-sectional view, with a third fixing element.

FIG. 4 shows a fixing element 3" with means 3"a for holding a plurality of optical wave-guide cables 2, in which the fixing element is of flat construction and the optical wave-guide cables fit closely side by side flat against the wall 1a of the pipe 1. The holding means 3"a are formed, for example, by a serpentine stainless-steel strip forming individual chambers in which the optical wave-guides are clipped by the conduit robot. The holding element 3"a is held on the pipe wall, again by means of a closed special-steel ring.

The flat construction is important, particularly with inaccessible conduit and pipe systems, in order to keep the obstructions formed thereby as small as possible.

Figure 5:
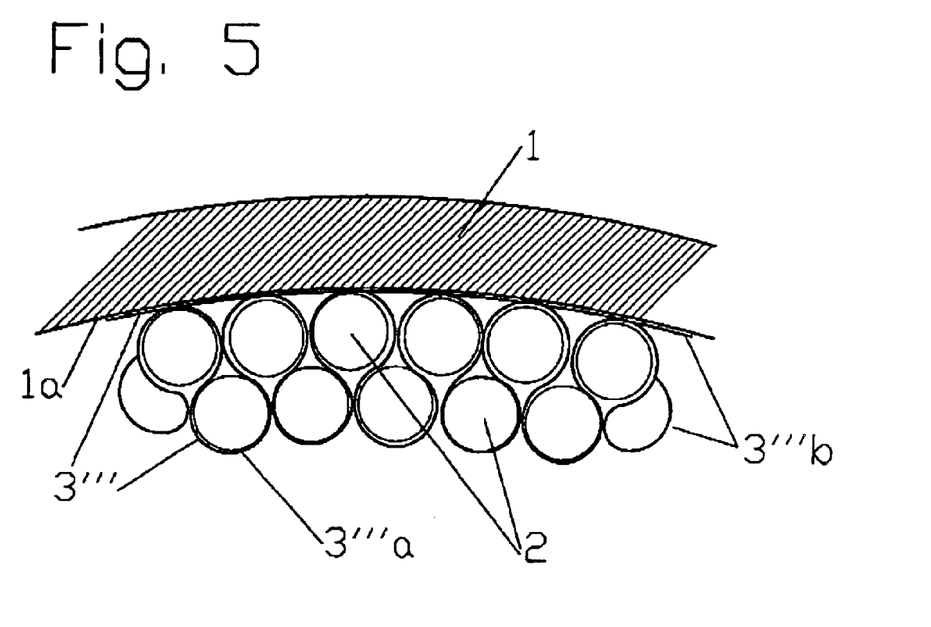
FIG. 5 is a schematic cross-sectional view, with a fourth fixing element.

FIG. 5 shows a variant of the multiple-cable system of FIG. 4, in which, again, a plurality of optical wave-guides are arranged side by side in a first layer on the wall 1a. A second layer of optical wave-guide cables is placed in a staggered arrangement over this first layer. The fixing means 3'''a again are formed by a serpentine stainless-steel strip forming chambers arranged side by side.

Conventional optical wave-guide cables are composed of a plurality of individual bundles of fibres which are surrounded by a cable sheath. Optical wave-guide cables of this type are suitable in particular for regional and long-distance communication ranges. When optical wave-guides are to be laid to individual households or subscribers, however, these conventional optical wave-guide cables are too large and cannot be handled sufficiently flexibly.

An optical wave-guide cable composed of one bundle of fibres surrounded by a sheath is preferably used. The diameter of this optical wave-guide cable is normally less than 15 mm, preferably from 3 to 4 mm. As the sheath, a metal sheath may be considered in particular, since it would also ensure adequate protection against rodents.

A plurality of these optical wave-guide cables may, for example, be held side by side in fixing elements according to FIG. 4 or 5 in a conduit or pipe system. The many small optical wave-guide cables ensure very good flexibility of use. All types of cable connection can be formed by virtue of the maximal branching capability of the optical wave-guide cable network which can thus be achieved.

In particular, special-steel pipes or pipes made of other metals or alloys may be used as sheaths for these small optical wave-guide cables. Owing to the small diameter of these optical wave-guide cables, laying in pipes with diameters of a few centimetres, in particular, is also possible.

If, in multiple-cable systems, not all of the clips are occupied by cables, the remaining cavities may be closed by plugs in order to protect them from soiling. The plugs are removed prior to the placing of further cables by the conduit robot.

Figure 7:
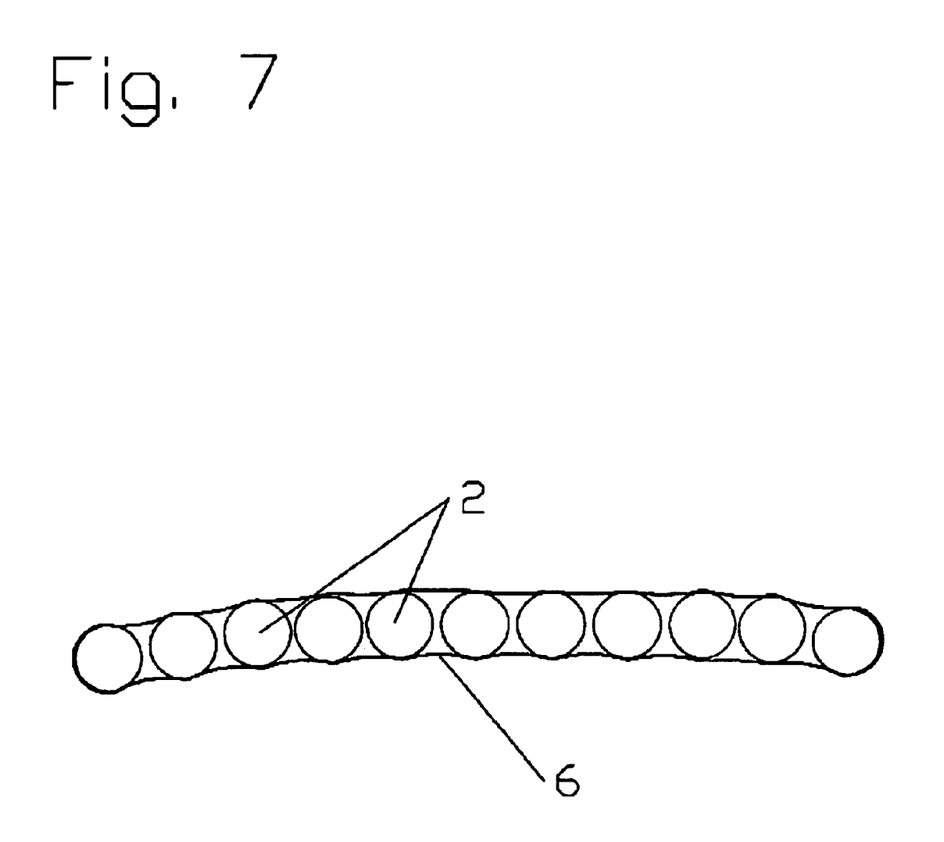
FIG. 7 is a schematic view of a flat cable.

A further cable embodiment is shown in FIG. 7 in which one or a plurality of the optical wave guides are again incorporated in a metal sheath and a plurality of such sheaths are joined together to form a flat cable. The cable is not bulky owing to its flat construction and permits very easy laying in the conduit or pipe system.

Figure 8:
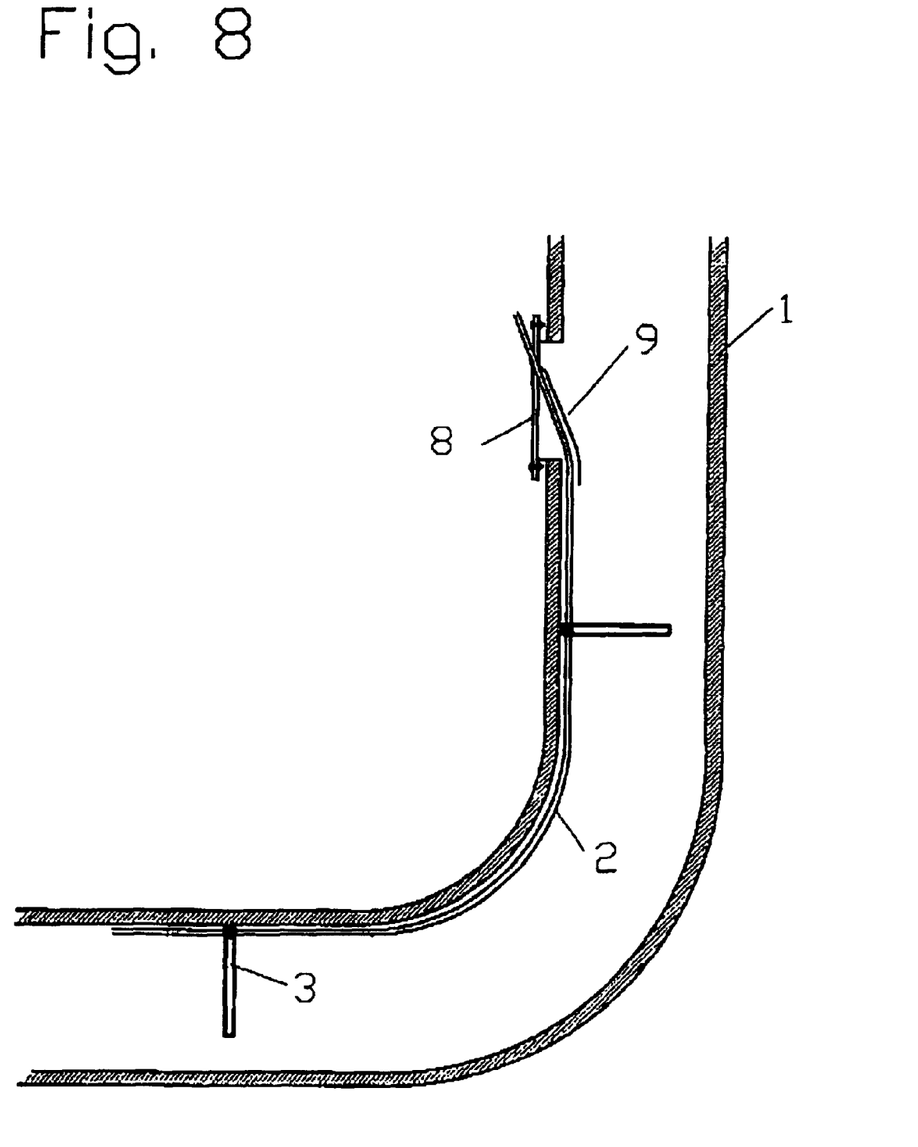
FIG. 8 is a schematic view of the optical wave-guide in the region of the exit from the conduit or pipe system.

The optical wave-guide cable is led out of the conduit system, for example, in a so-called conduit-cleaning portion, see FIG. 8. For this purpose the conduit-cleaning portion is provided with a special cover 8, which provides a through-lead for the optical wave-guide cable, and which can be taken off without affecting the optical wave-guide cable, cleaning of the pipe system also remaining possible without restriction, through the inspection opening. The through-lead in this case is advantageously formed in a manner such that the cable is led through obliquely and inclined greatly towards the cover so that the cable has to be bent only slightly. The region of the through-lead is additionally protected against sediments by a covering cap 9. Naturally, the through-lead position is formed so as to be watertight and airtight. Other exits may be considered, for example, in the field of rainwater pipes, within the scope of the invention. Should the subscriber's pipe system offer no usable possibility for the cable exit, the last meters to the subscriber may ultimately be laid outside the pipe system, for which only small digging operations arise, or an underground connection is made to or from the conduit or pipe system by means of a normal pressure device.

The laying and assembly of the optical wave-guide cable network by means of the conduit robot takes place substantially as follows:

The robot, which is equipped with one or a plurality of cameras, moves into the pipe system on wheels or chains (FIG. 6). The movement and the various tools can be influenced by remote control. The optical wave-guide cables can be hung on the robot and are put in place in the pipe system during the first trip or else during subsequent trips through the system.

The robot takes the prefabricated fixing means from a magazine carried with the robot and places them in the pipe. The holding means for the optical wave-guide cable may be either already mounted on the fixing means or fixed thereto by the robot only in a subsequent step.

The magazine may also be formed in a manner such that it contains a spring steel strip wound on a reel, from which the special-steel rings can be separated in the lengths necessary for the pipe system by the conduit robot. This has the advantage that it is not necessary to have available and to make different special-steel rings for different pipe diameters, which leads to favourable installation times and construction costs.

What is claimed is:

1. An optical wave-guide cable network, comprising:
   conduit or pipe systems connected to buildings;
   optical wave-guide cables mounted on a wall of the conduit or pipe systems;
   fixing elements for mounting the optical wave-guide cables on the wall of the conduit or pipe system, the fixing elements comprising means for holding at least one optical wave-guide cable and means for fixing on the wall of the conduit or pipe system;
   wherein the fixing means are formed by a resiliently prestressed, closed stainless steel ring which is pressed against the wall of the conduit or pipe system.

2. An optical wave-guide cable network according to claim 1, wherein the fixing elements are shaped so as to favour a flow.

3. An optical wave-guide cable network according to claim 1, wherein the fixing element comprises means for holding a plurality of optical wave-guide cables, the fixing element being formed in a manner such that the optical wave-guide cables are fitted closely side by side and flat against the wall of the conduit or pipe system.

4. An optical wave-guide cable network according to claim 1, wherein the means for holding an optical wave-guide cable are formed as snap clips.

5. An optical wave-guide cable network according to claim 1, wherein the optical wave-guide cable comprises a metal tube in which optical wave-guide fibres are arranged.

6. An optical wave-guide cable network according to claim 5, wherein the tube has a diameter of less than 15 mm.

7. An optical wave-guide cable network according to claim 1, wherein the optical wave-guide cable network is led through a sewage conduit and is led out of the conduit or pipe system in the region of a conduit-access portion for cleaning.

8. An optical wave-guide cable network according to claim 1, wherein the optical wave-guide cable is fixed in a cable duct on the wall of the conduit or pipe system.

9. An optical wave-guide cable network according to claim 1, wherein, in order to fix the optical wave-guide cable, the fixing element is formed in a manner such that the optical wave-guide cable is fixed between the wall of the conduit or pipe system and the fixing element.

10. An optical wave-guide cable network according to claim 3, wherein the optical wave-guide cables comprise an outer metal tube with good flectional characteristics combined with good stability and a diameter of less than 15 mm, in which optical wave-guide fibres are arranged.

* * * * *